United States Patent
Ralston

(10) Patent No.: US 9,842,014 B2
(45) Date of Patent: Dec. 12, 2017

(54) DATA PROCESSING DEVICE, METHOD OF EXECUTION ERROR DETECTION AND INTEGRATED CIRCUIT

(71) Applicant: John Ralston, Glasgow (GB)

(72) Inventor: John Ralston, Glasgow (GB)

(73) Assignee: NXP USA, Inc., Austin, TX (US)

( * ) Notice: Subject to any disclaimer, the term of this patent is extended or adjusted under 35 U.S.C. 154(b) by 184 days.

(21) Appl. No.: 14/646,177

(22) PCT Filed: Nov. 22, 2012

(86) PCT No.: PCT/IB2012/056635
§ 371 (c)(1),
(2) Date: May 20, 2015

(87) PCT Pub. No.: WO2014/080245
PCT Pub. Date: May 30, 2014

(65) Prior Publication Data
US 2015/0293807 A1   Oct. 15, 2015

(51) Int. Cl.
*G06F 11/00* (2006.01)
*G06F 11/07* (2006.01)
(Continued)

(52) U.S. Cl.
CPC ........ *G06F 11/0757* (2013.01); *G06F 11/079* (2013.01); *G06F 11/0721* (2013.01);
(Continued)

(58) Field of Classification Search
USPC .......................................................... 714/11
See application file for complete search history.

(56) References Cited

U.S. PATENT DOCUMENTS 5,136,704 A    8/1992  Danielsen et al.
5,357,237 A    10/1994 Bearden et al.
(Continued)

FOREIGN PATENT DOCUMENTS

EP    1496435 A1    1/2005
WO   2006032682 A1  3/2006
(Continued)

OTHER PUBLICATIONS

Oh, N. et al.: "Error Detection by Duplicated Instructions in Super-Scalar Processors", IEEE Transaction on Reliability, 2002, vol. 51, No. I, pp. 63-75.

(Continued)

*Primary Examiner* — Sarai Butler

(57) ABSTRACT

A data processing device provided with an error detection unit includes a processor arranged to support execution of an operation including a first sequence of instructions and execution of a second sequence of instructions implementing the operation, the first and second sequences of instructions generating, when in use, a first result and a second result, respectively. Configurable circuitry is also provided and arranged to support a repository to receive the first result and the second result following generation thereof. The configurable circuitry is configured as a function comparator unit arranged to compare the first and second results for consistency and to control further execution of the first implementation and the second implementation in response to a result of the comparison.

17 Claims, 13 Drawing Sheets

(51) Int. Cl.
*G06F 11/14* (2006.01)
*G06F 11/16* (2006.01)

(52) U.S. Cl.
CPC ...... *G06F 11/1494* (2013.01); *G06F 11/1641* (2013.01); *G06F 2201/835* (2013.01)

(56) References Cited

U.S. PATENT DOCUMENTS

| | | |
|---|---|---|
| 5,452,443 A | 9/1995 | Oyamada et al. |
| 6,327,668 B1 | 12/2001 | Williams |
| 6,421,790 B1 | 7/2002 | Fruehling et al. |
| 6,640,313 B1 | 10/2003 | Quach |
| 6,907,443 B2 | 6/2005 | Murray |
| 6,928,583 B2 | 8/2005 | Griffin et al. |
| 7,020,798 B2 | 3/2006 | Meng et al. |
| 7,283,409 B1 | 10/2007 | Voogel et al. |
| 7,308,605 B2 | 12/2007 | Jardine et al. |
| 7,426,656 B2 | 9/2008 | Bernick et al. |
| 7,472,051 B2 | 12/2008 | Mariani et al. |
| 7,827,429 B2 | 11/2010 | Matsumoto |
| 8,650,440 B2 | 2/2014 | Rohleder et al. |
| 8,854,049 B2 | 10/2014 | Bogenberger et al. |
| 2002/0023202 A1 | 2/2002 | Mukherjee |
| 2005/0080988 A1 | 4/2005 | Teng |
| 2005/0278588 A1 | 12/2005 | Cohn et al. |
| 2006/0095821 A1 | 5/2006 | Mukherjee et al. |
| 2007/0277023 A1 | 11/2007 | Weiberle et al. |
| 2008/0163016 A1 | 7/2008 | Cohn et al. |
| 2008/0209251 A1 | 8/2008 | Kottke |
| 2008/0229134 A1 | 9/2008 | Pradip et al. |
| 2008/0244305 A1 | 10/2008 | Troppmann et al. |
| 2009/0044048 A1 | 2/2009 | Weiberle et al. |
| 2009/0055674 A1 | 2/2009 | Mueller et al. |
| 2009/0125749 A1 | 5/2009 | Weiberle et al. |
| 2009/0164826 A1 | 6/2009 | Kottke |
| 2010/0235558 A1 | 9/2010 | Snead |
| 2011/0066779 A1 | 3/2011 | Bogenberger et al. |
| 2011/0231709 A1* | 9/2011 | Bellocchio .............. G06F 21/55 714/38.1 |
| 2012/0011407 A1* | 1/2012 | Fuchigami .......... G06F 11/0721 714/39 |
| 2012/0173924 A1 | 7/2012 | Xiao et al. |
| 2012/0173933 A1* | 7/2012 | Greb ................... G06F 11/0751 714/47.1 |
| 2015/0149815 A1* | 5/2015 | Maity ................. G06F 11/1435 714/5.11 |
| 2016/0092320 A1 | 3/2016 | Baca et al. |
| 2016/0092392 A1* | 3/2016 | Yong .................. G06F 13/4086 714/43 |

FOREIGN PATENT DOCUMENTS

| | | |
|---|---|---|
| WO | 2006045780 A1 | 5/2006 |
| WO | 2006045798 A1 | 5/2006 |
| WO | 2008146091 A1 | 12/2008 |
| WO | 2011/101707 A1 | 8/2011 |

OTHER PUBLICATIONS

International Search Report and Written Opinion correlating to PCT/IB2012/056635 dated Jun. 27, 2013.
Final Office Action dated Oct. 6, 2014 for U.S. Appl. No. 13/577,072, 27 pages.
Non-Final Office Action dated Oct. 6, 2014 for U.S. Appl. No. 13/577,072, 28 pages.
Notice of Allowance dated Feb. 3, 2015 for U.S. Appl. No. 13/577,072, 21 pages.
Non-Final Office Action dated Jan. 27, 2017 for U.S. Appl. No. 14/496,552, 9 pages.
Non-Final Office Action dated Jun. 9, 2016 for U.S. Appl. No. 14/496,552, 14 pages.
Hammadi, N. et al. "Fault tolerant constructive algorithm for feed forward neural networks" ISBN 0-8186-8212-4; IEICE Trans. INF. and SYS., vol. E81-D, No. 1; Jan. 1998; pp. 115-123.
Mukherjee, S.S. et al., "Detailed Design and Evaluation of Redundant Multithreading Alternatives," 29th ISCA 2002, Anchorage, AK, USA; IEEE Computer Society, May 25-29, 2002, 12 pages.
Notice of Allowance dated Aug. 2, 2017 for U.S. Appl. No. 14/496,552, 16 pages.

* cited by examiner

DATA PROCESSING DEVICE, METHOD OF EXECUTION ERROR DETECTION AND INTEGRATED CIRCUIT

FIELD OF THE INVENTION

This invention relates to a data processing device, a method of execution error detection and an integrated circuit.

BACKGROUND OF THE INVENTION

In the field of programmable electronic systems, it is known to verify the reliability of algorithms executing independently, either on different cores or the same core. In this respect, for certain applications requiring redundancy and/or that are "mission critical", it is known for the independent algorithms to comprise the execution of a same function.

To achieve this objective, solutions have been proposed both at a hardware level and a software level in order to ensure consistency in results provided by each function or even algorithm.

One known solution is the so-called "lock-step" verification technique, which monitors synchronism between Central Processing Units (CPUs) in order to detect execution errors that may impact upon the reliability of one or more applications supported by the CPUs. In this respect, hardware is provided to monitor the response of each CPU at a level of granularity associated with a bus interface, for example one or both clock edges. Consequently, in the event that one or both of the CPUs suffer a malfunction, the error can be detected. In order to detect the error, a hardware entity comprising many comparators is provided to monitor the external interfaces of the CPUs. As can be appreciated, the amount of hardware overhead required to support such a level of error detection is considerable for just two CPUs. If one then considers the possibility of performing error detection in respect of many CPUs, the hardware overhead increases further and indeed can even be impossible or uneconomic to support.

Another "lock-step" technique known in the art is implemented in software as opposed to hardware. This technique is employed in relation to a single CPU or multiple CPUs executing algorithms multiple times in order to verify functional consistency. In this respect, the algorithm can be expressed differently, for example using different compiler languages. The algorithm can comprise multiple functions that can be compared at the function level. In this respect, a software module is used to compare the results of the function executions.

U.S. Pat. No. 7,827,429 relates to a fault tolerant computer comprising a first unit, a second unit, a delay buffer and a delay time setting unit. The first unit executes a computer program in response to an input signal. The second unit executes the computer program in the same execution environment as the first unit in response to the input signal. The delay buffer controls a delay between when the input signal is input to the first unit and when the input signal is input to the second unit, and is set to zero when receiving a synchronisation mode signal.

International patent application publication number WO 2011/101707 A1 relates to an alternative implementation of error detection between CPUs in which access to volatile and non-volatile memory is observed and, if required, volatile "transactions" are replayed. In this connection, a first of a number of CPUs in a so-called validation set supporting a function performs the function, the result of which are assumed to be valid and so the results are stored and replicated to the other CPUs in the validation set.

SUMMARY OF THE INVENTION

The present invention provides a data processing device provided with an error detection unit, a method of execution error detection and an integrated circuit as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Figure 1:
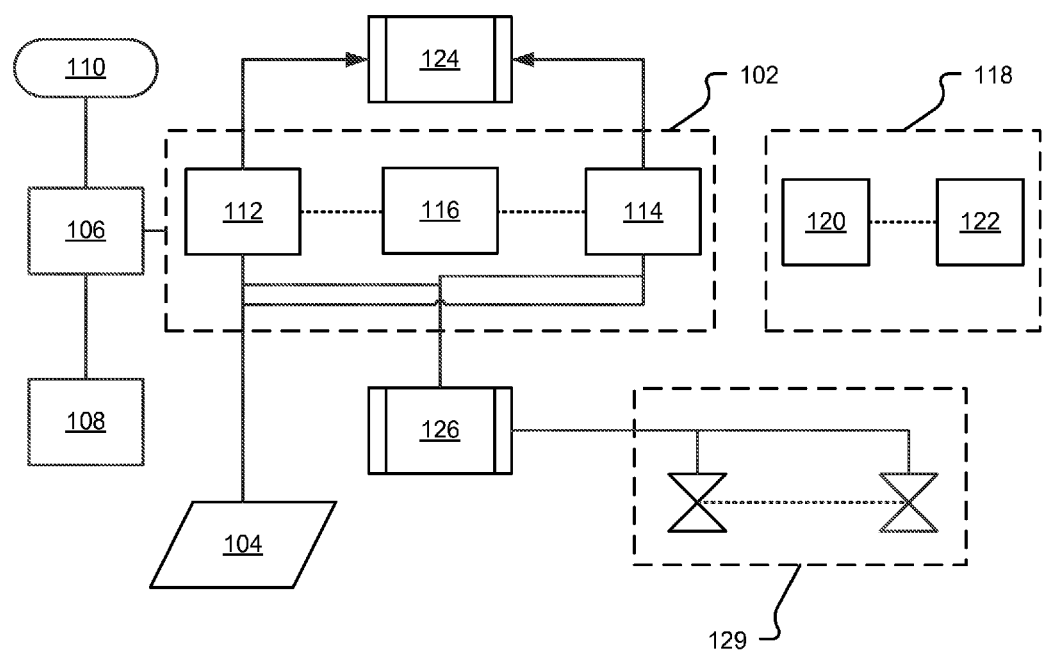
FIG. 1 is a schematic diagram of an example of a data processing device provided with an error detection unit.

According to a first example, there is provided a data processing device provided with an error detection unit comprising: a processor arranged to support execution of an operation comprising a first sequence of instructions and execution of a second sequence of instructions implementing the operation, the first and second sequences of instructions generating, when in use, a first result and a second result, respectively; and configurable circuitry arranged to support a repository to receive the first result and the second result following generation thereof; wherein the configurable circuitry is configured as a function comparator unit arranged to compare the first and second results for consistency and to control further execution of the first implementation and the second implementation in response to a result of the comparison; and the function comparator unit comprises a first watchdog timer unit arranged to police a first time period in response to an instruction to perform the operation.

The first watchdog timer unit may identify an exception condition in response to elapse of the first time period without receipt by the repository of the first result.

The function comparator unit may be arranged to detect receipt of the first result; the function comparator unit may comprise a second watchdog timer unit arranged to police a second time period in response to receipt by the repository of the first result.

The second watchdog timer unit may be arranged to identify an exception condition in response to elapse of the second time period without receipt by the repository of the second result.

The function comparator unit may be arranged to permit further execution of the first and second sequences of instructions in response to receipt by the repository of the first and second results before expiry of the first time period and the second time period, respectively.

The processor may comprise a core supporting sequential execution of the first sequence of instructions and the second sequence of instructions. The function comparator unit may be arranged to set a duration of the second time period to be equal to a predetermined period of time in excess of the duration of the first time period.

The processor may comprise a first core supporting execution of the first sequence of instructions and a second core supporting execution of the second sequence of instructions.

The first core may have a first architecture associated therewith and the second core may have a second architecture associated therewith; the first and second architectures may be different.

The first sequence of instructions may be in accordance with a first implementation methodology and the second sequence of instructions may be in accordance with a second implementation methodology.

An intended function of the first implementation may be the same as an intended function of the second implementation.

The processor may comprise a third core supporting execution of a third sequence of instructions implementing the operation. The second core may support a third sequence of instructions.

The third sequence of instructions may be a second instantiation of the second implementation.

The third sequence of instructions may be arranged to generate a third result; the function comparator unit may be arranged to compare the first, second and third results for consistency and to identify a majority of the first, second and third results that are consistent.

The function comparator unit may be arranged to identify an inconsistent result from the first, second and third results and to prevent further execution of the sequence of instructions from the first, second and third implementations of the operation associated with the inconsistent result.

The first result and the second result may be the results of a first input/output transaction request and a second input/output transaction request, respectively. The third result may be a third input/output transaction request.

The function comparator unit may be arranged to execute the first and second input/output transaction request in response to the first and second input/output transaction requests being determined to be consistent.

The comparison performed by the function comparator unit may be relative to a predetermined threshold.

According to a second example, there is provided a method of execution error detection comprising: supporting execution of an operation comprising a first sequence of instructions and execution of a second sequence of instructions implementing the operation; the first sequence of instructions generating a first result; the second sequence of instructions generating a second result; the repository receiving the first result and the second result following generation thereof; configuring configurable circuitry to supporting a repository and a function comparator unit; and the function comparator unit comparing the first and second results for consistency and controlling further execution of the first implementation and the second implementation in response to a result of the comparison.

According to a third example, there is provided an integrated circuit comprising a data processing device as set forth above in relation to the first example.

Because the illustrated examples may for the most part, be implemented using electronic components and circuits known to those skilled in the art, details will not be explained in any greater extent than that considered necessary, for the understanding and appreciation of the underlying concepts of the present invention and in order not to obfuscate or distract from the teachings of the present invention.

As used herein, the processor can for example be a microprocessor, such as a general purpose microprocessor, a microcontroller, a coprocessor, a digital signal processor, an embedded processor. The processor can have one or more processor cores, also referred to as CPU's in this application. A CPU typically comprises a so-called "Arithmetic Logic circuit Unit" (ALU) that performs arithmetic and logic circuital operations, and a "Control Unit" (CU) that extracts instructions from memory and decodes and executes the instructions. The processor may, in addition to the processor core, further comprise inputs/outputs and/or other components, such as communication interfaces, e.g. external bus interfaces, DMA controllers, and/or coprocessors and/or analog-to-digital converters and/or clocks and reset generation units, voltage regulators, memory (such as for instance flash, EEPROM, RAM), error correction code logic and/or timers, and/or hardware accelerators or other suitable components. The processor can for example be implemented as an integrated circuit, i.e. on one or more dies provided in a single integrated circuit package.

Referring to FIG. 1, a processing system 100 comprises a data processing device provided with an execution error detection unit that can comprise a processor 102 operably coupled to a memory resource 104 and an exception module 106. The exception module 106 is operably coupled to system control 108 for the processing system 100 and also comprises an external failure indicator output 110. The system control 108 is circuitry typically present in a processing system to oversee resources of the processing system, for example to initiate execution of code by a core. As such, in order not to distract from the important teachings herein, further details of the control system 108 will not be described further herein.

In this example, the processor 102 comprises a plurality of cores, for example a first core 112, a second core 114 and a third core 116. The first, second and third cores 112, 114, 116 constitute a validation set. The processor 102 can also comprise other cores that are not part of the function validation set 118, for example a fourth core 120 and a fifth core 122.

The processing system 100 also comprises a function validation module 124 operably coupled to the processor 102 and an input/output (I/O) validation module 126. The I/O validation module 126 is operably coupled to an I/O validation set 129.

Figure 2:
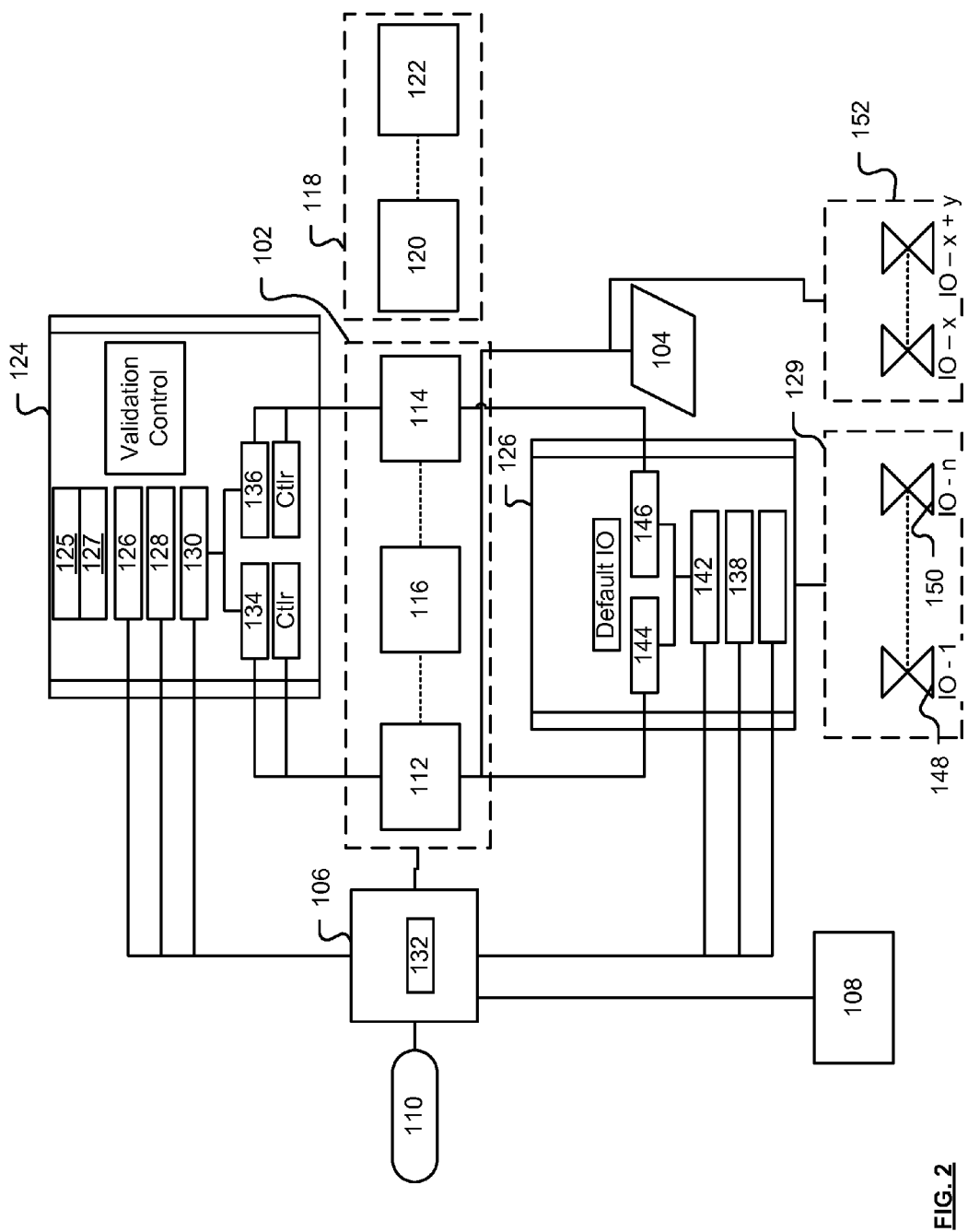
FIG. 2 is a schematic diagram of the apparatus of FIG. 1 in greater detail.

Referring to FIG. 2, the function validation module 124 is formed from configurable circuitry. The configurable circuitry is configured to support a first watchdog timer 126 and a second watchdog timer 128, a first function comparator unit 130 as well as a validation control unit 121. The first watchdog timer 126, the second watchdog timer 128 and the first functional comparator unit 130 are operably coupled to the exception module 106, the exception module 106 comprising an exception handling table 132. The configurable circuitry is also configured to support a repository for storing data. In this example, the repository comprises a first results register 134 and a second results register 136 operably coupled to the first function comparator unit 130 and the first core 112 and the second core 114, respectively.

As such, it can be seen that the configurable circuitry is arranged to support a repository to receive the first result and the second result following generation thereof, and the configurable circuitry is also configured as a function comparator unit arranged to compare the first and second results for consistency and to control further execution of the first implementation and the second implementation in response to a result of the comparison. Hence, it can be seen that the function comparator unit can comprise a first watchdog timer unit arranged to police a first time period in response to an instruction to perform the operation.

Although not shown in FIG. 2, as a member of the validation set, the third core 116 also have a respective third results register. Hence, by extension, a validation set of n members has n respective results registers associated therewith.

In this example, the I/O validation module 126 is also formed from the configurable circuitry. The configurable circuitry is configured to support a third watchdog time 138 and a second function comparator unit 142. In this example, the third watchdog timer 138 and the second function comparator 142 are operably coupled to the exception module 106. The configurable circuitry is also configured to support another repository for storing data relating to input/output transactions. In this example, the repository comprises a first transaction request register 144 and a second transaction request register 146 operably coupled to the second function comparator unit 142 and the first core 112 and the second core 114, respectively.

The input/output validation set 129 comprises, in this example, a first input/output device 148 and a second input/output device 150. However, the skilled person will appreciate that the input/output validation set 129 can be configured to comprise any number of different input/output devices available to the processing system 100. It therefore follows that the processing system 100 can also comprise one or more input/output devices that are not part of the I/O validation set 152, the input/output devices that do not form part of the I/O validation set 152 being operably coupled to the memory 104. The I/O resource of the I/O validation set can be internal and/or external to the processing system 100.

Although not described in relation to FIG. 2, the third core 116 is also operably coupled to a third transaction results register (not shown). Hence, by extension, a validation of n set members can have n transaction results registers associated therewith.

For the sake of clarity, it should be appreciated that members of a function validation group and an I/O validation set can be selected independently.

The examples described herein can be used in accordance with a concurrent mode of operation and a time-shifted mode of operation. In the concurrent operation mode, all of the members of a validation set perform the same function, which can comprise one or more I/O transaction (but this is not mandatory), substantially contemporaneously and are not permitted to continue executing code until a successful outcome is obtained, whereas in a time-shifted mode the same function is performed n times and the results of each iteration is respectively stored, the core not being permitted to execute more code following completion of the iterations until a successful outcome is obtained. After the n iterations a comparison is performed. Furthermore, it should be noted that a given implementation is not limited to either the concurrent mode or the time-shifted mode only, and a combination of these two modes of operation can be employed.

Figure 3:
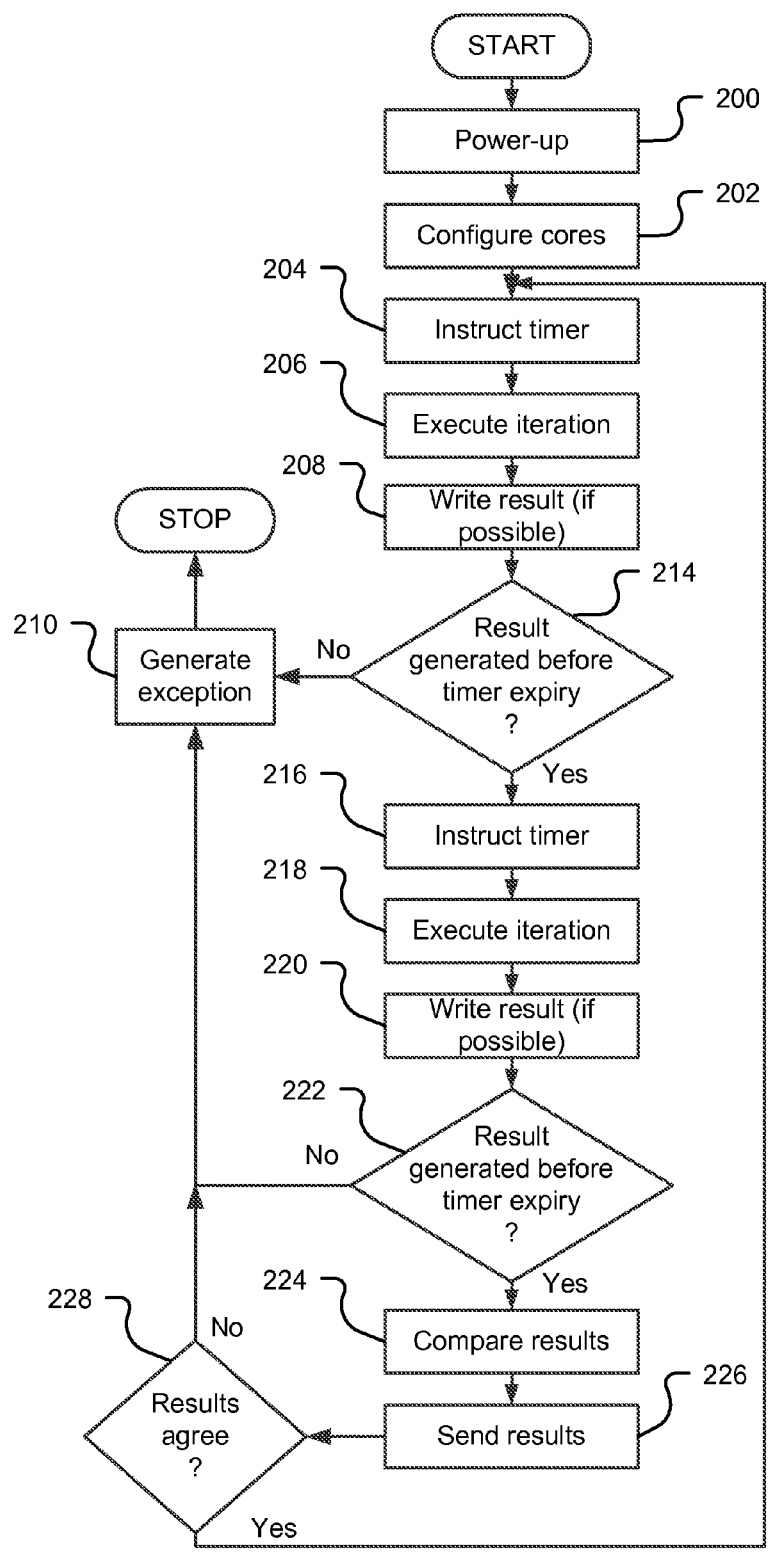
FIG. 3 is a flow diagram of an example of a method of execution error detection employed by the apparatus of FIGS. 1 and 2.
Figure 4:
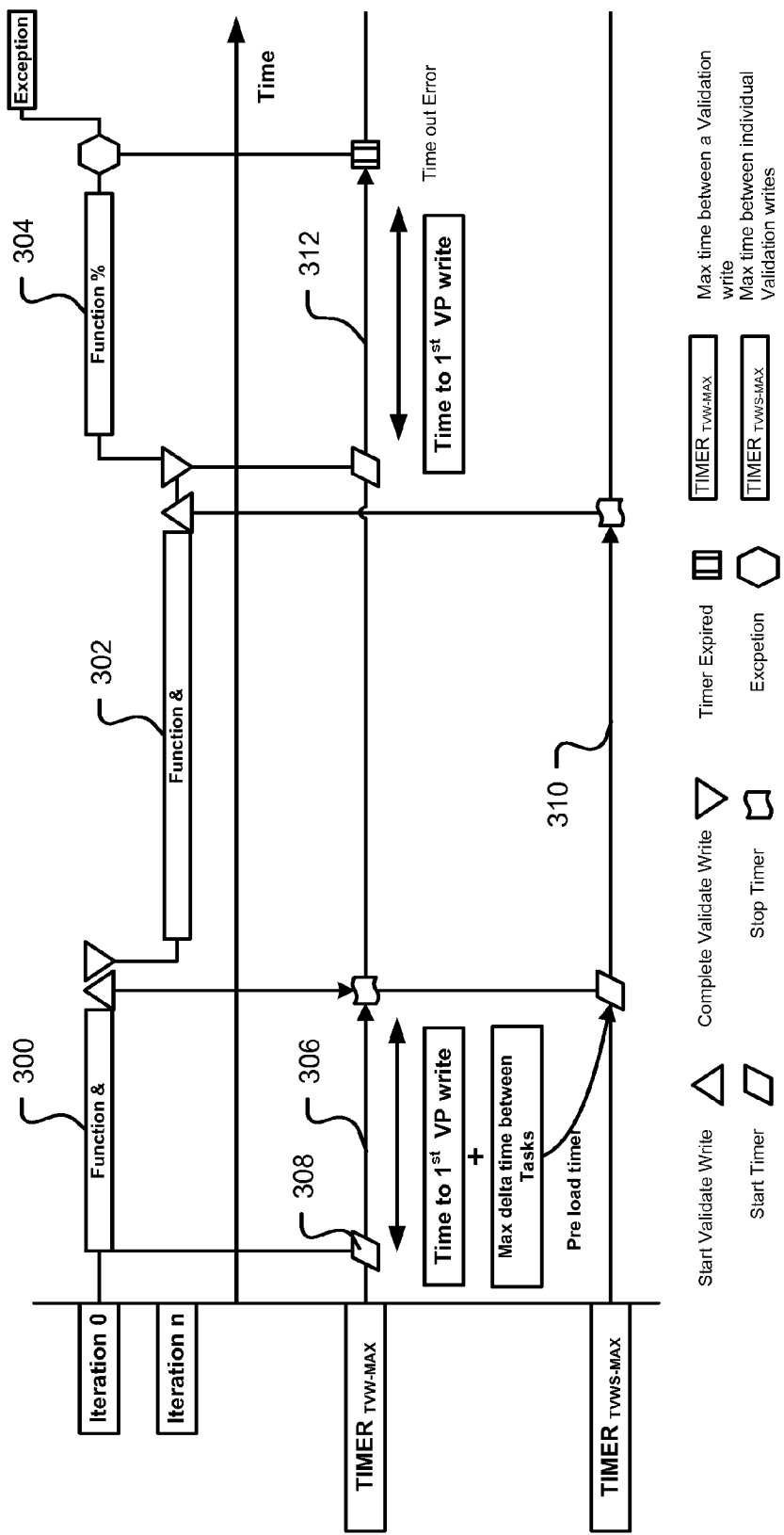
FIG. 4 is an event sequence diagram of an example of execution of functions by a first core.

In operation (FIGS. 3 and 4), the processing system 100 is powered-up (Block 200) by the application of power and a RESET input (not shown) of the processing system 100 is "negated". The internal hardware of the processing system 100 then configures (Block 202) the processing system 100 so that instructions provided by a user can be executed by the processing system 100. Additional configuration is provided by way of the instructions written by the programmer of the processing system 100 (hereinafter referred to as "user code") and stored in memory, for example configuration of the exception tables of the processing system 100 to provide desired responses when exceptions occur, for example by associating input signal types to be received from the functional validation module 124 and the I/O validation module 126 to actions to be taken by the exception module 106, such as generation of interrupts to all cores or just a number of the cores, placing a core in a core RESET state, or forcing the complete processing system 100 to enter a device RESET state. In this regard, the additional configuration can be provided in user code executed by the core(s), some specific to the processing system 100 and the functionality required and I/O resources connected to the processing system 100. However, in order not to distract from the important teachings of the examples set forth herein, the configuration of the processing system will not be described further herein.

To initialise/configure the processing system 100, a set of default values are loaded during the release of a RESET input (not shown). The configuration of the processing system 100 can range from simply disabling generation of exceptions or completely configuring the exception table 132. In either case, the instructions provided by the programmer can be used to complete/change the configuration of the processing system 100 provided the correct validation functionality is achieved. In this example, the configuration includes setting an initial value of the first watchdog timer 126 in a first initial storage element 125. In respect of the time-shifted mode of operation, an initial value of an offset register 127 is set for use as part of an initial value for the second watchdog timer 128. Additionally, the exception table 132 and handling method, i.e. the actions to be initiated by the exception module 106 in response to receipt of types of input signals, for the exception module 106 are set as well as the mode of operation of the validation module 124, i.e. time-shifted or concurrent mode. In the event that the time-shifted mode is to be employed, the number of iterations to be performed by the relevant core for each function is set.

In this example, the first core 112 implements a time-shifted mode. The function to be executed by the first core 112 in this example implements the same algorithm for first and second iterations of the function. However, the skilled person should appreciate that the first and second iterations need not have been implemented using the same algorithm.

As described herein, it should be appreciated that a function is an entity that provides a relationship between two sets: INPUT{ } and OUTPUT{ }, such that each element or combination of members of the INPUT{ } set maps uniquely to one member of the OUTPUT{ } set. An operation, or algorithm as described herein, is a sequence of instructions for implementing such a function. A member of the OUTPUT { } set in respect of a function is such that the complete value of the member, a portion thereof or a representation of the member, can be used to write to a results register for analysis by a validation module, for example the validation module 124.

The function can be implemented using different programming languages or even different instruction set architectures.

Herein, the data processing device or system provided with an error detection unit comprises a processor arranged to support execution of a first operation comprising a first sequence of instructions and a second operation comprising a second sequence of instructions, the first and second operations generating, when in use, a first result and a second result, respectively.

After configuration (Block 202), the first core 112 therefore enters an operational state for executing a first iteration of a first function 300 and a second iteration of the first function 302, as well as a first iteration of a second function 304 and a second iteration of the second function (not shown). In this example, the function validation module 124 enters that the validation mode of operation from reset of the processing system 100. However, in another example, the function validation module 124 can be set by one of the cores of the validation set to enter into the validation mode by writing to a control register (not shown) having an enable bit. In either case, the function validation module 124 needs to be configured, for example with the number of iterations to be performed as part of validation.

Once the function validation module 124 has been instructed to enter the validation mode, it loads (Block 204) a first watchdog time 306 into the first watchdog timer 126 from the initial storage element 125 and starts the first watchdog timer 126, thereby initiating monitoring of the first watchdog time 306. In this example, the first watchdog timer 126 counts down, but the skilled person should appreciate that a count-up implementation can be employed.

The first core 112 then initially executes (Block 206) the first iteration of the first function 300, which results in the generation a first result that is stored (Block 208) by the first core 112 in the first results register 134. As execution of the first iteration of the first function 300 is completed and the first result is written to the first results register 130, in this example, before expiry of the first watchdog time 306 (Block 214), the exception module 106 does not need to generate an exception (Block 210). The first iteration of the first function 300 therefore generates a result that is stored (Block 214). As the first core 112 is operating in the time-shifted mode, when the function validation module 124 writes to the first results register 134, in respect of the first iteration of the first function 300, the function validation module 124 calculates the amount of time taken to complete execution of the first iteration of the first function 300 (by subtracting the value of the first watchdog timer 126 from the initially configured value of the first watchdog timer 126 that is stored in the first initial storage element 125) and stores this value in a temporary register 123, and retrieves a delta time predetermined to constitute a maximum permissible time delay between completion of execution of the first function 300 and executing a subsequent iteration of the first function 300. In this respect, the delta time is stored in the offset register 127, which is added to the time value stored in the temporary register 123 (the time taken to execute the first iteration of the first function 300), the result of the summation being used as the initial value of the second watchdog timer 128.

Thereafter, the function validation module 124 programmes (Block 216) the second watchdog timer 128 with the time calculated and stored in the temporary register 123 to monitor a second watchdog time. Hence, the validation module 124 can be arranged, for example using the validation control unit 121, to set a duration of the second time period to be equal to a predetermined period of time in excess of the duration of the first time period. Thereafter, and after the result generated by the first iteration of the first function 300 has been written to the first results register 134, the first core 112 initiates (Block 218) execution of the second iteration of the first function 302. In the event that the second iteration of the first function 302 completes execution and writes (Block 220) a second result generated by the second iteration of the first function 302 to the second results register 136 before expiry (Block 222) of the second watchdog time 310 being monitored by the second watchdog timer 128, the first comparator unit 130 then compares (Block 224) the first result and the second result stored in the first and second results register 134, 136 to ensure that the results agree.

In this example, the validation module 124 is configured to support two iterations, resulting in use of the first and second results registers 126, 128. However, it should be appreciated that for the time-shifted mode the number of iterations supported can be greater than two and implementation of a respective number of results registers can be such that the validation module 124 allows the first core 112 to write to a virtual common results register that is routed to a respective separate results register that is indexed according to the iteration of the function being performed.

Once a comparison has been completed (Block 224), the output of the first function comparator unit 130 is communicated (Block 226) to the exception module 106 and so in the event that the results do not agree (Block 228), the exception module 106 generates an exception (Block 210), which is communicated to the external failure indicator output 110. In the present example, the results agree (Block 228) and so the first core 112 is permitted to proceed to execute a first iteration of the second function 304 and so the above-described procedure (Blocks 204 to 228) are repeated in respect of the second function. Prior to execution of the first iteration of the second function 304, the first watchdog timer 126 is provided with a third watchdog time 312 (Block 204). The third watchdog time 312 to be monitored in respect of execution of the first iteration of the second function 304 can be the same time as the first watchdog time 306 in respect of the first iteration of the first function 300 (or a different time value).

The first iteration of the second function 304 is then permitted to execute (Block 206) while the first watchdog timer 126 monitors adherence to the third watchdog time 310 (Block 208). However, in this example, the first iteration of the second function 304 fails to complete execution within the third watchdog time 312 and so the first watchdog timer 126 communicates the expiry of the third watchdog time 312 to the exception module 106 and the exception module 106 generates (Block 210) an exception, which is communicated to the external failure indicator output 110. The function comparator unit is therefore arranged to detect receipt of the first result, where the function comparator unit comprises the second watchdog timer unit arranged to police a second time period in response to receipt by the repository of the first result. The second watchdog timer unit is therefore arranged to identify an exception condition in response to elapse of the second time period without receipt by the repository of the second result.

Although in this example, monitoring of execution errors by a single core is being used even though the processor 102 comprises multiple cores, the skilled person should appreciate that the processor 102 need not comprise all of the cores described herein and the processor 102 can comprise none of the additional cores or a smaller number of additional cores described herein.

Figure 5:
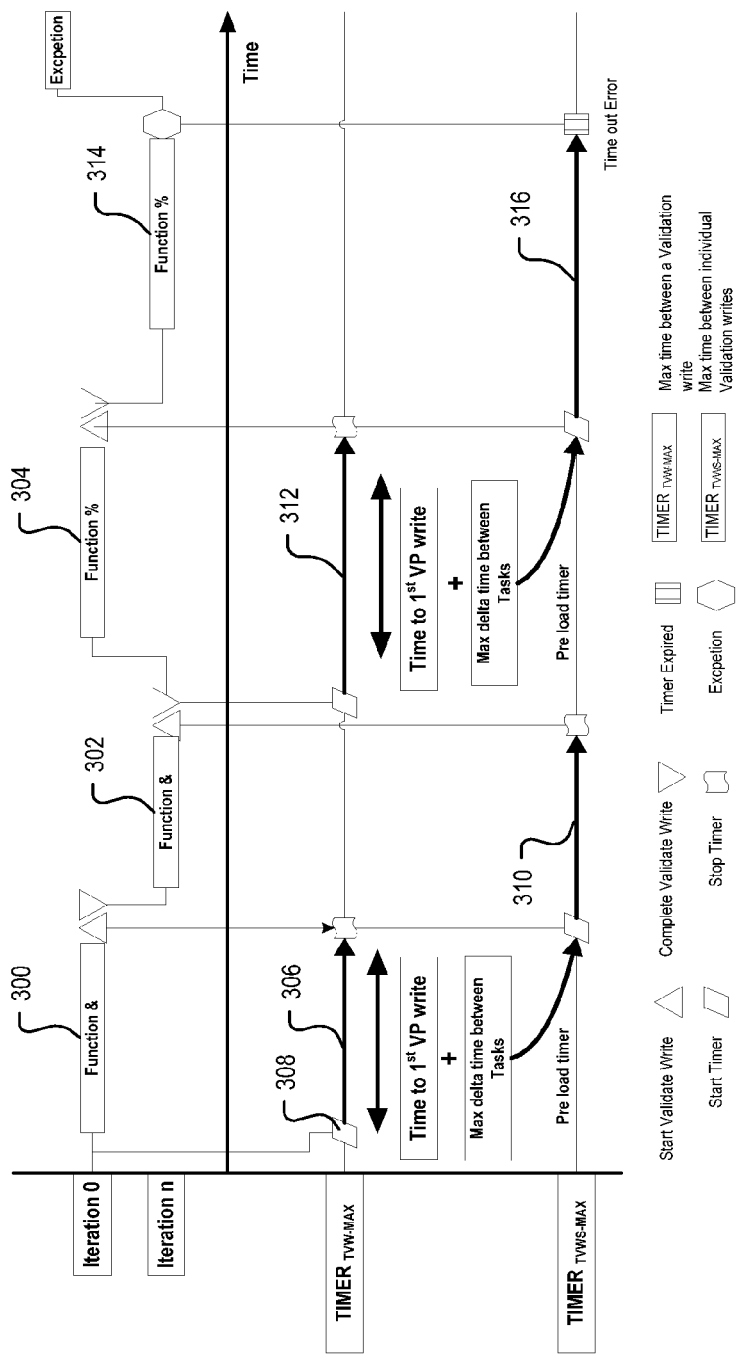
FIG. 5 is an event sequence diagram of another example of execution of functions by the first core.

Another example (FIG. 5) differs from the above-described example in that the first iteration of the second function 304 completes execution and a third result generated by the first execution of the second function 304 is written (Block 208) to the first results register 134 within the third watchdog time 312. As such, the exception module 106 does not need to generate an exception and the first core 112 is permitted to execute the second iteration of the second function 314. Consequently, prior to execution of the second iteration of the second function 314, the function validation module 124 calculates the amount of time taken to complete execution of the first iteration of the second function 304 (by subtracting the value of the first watchdog timer 126 from the initially configured value of the first watchdog timer 126) and stores this value in the temporary register 123, and retrieves a delta time to constitute a maximum permissible time delay between completion of execution of the current iteration of the second function 304 and executing a subsequent iteration of the second function 304. In this respect, the delta time is stored in the offset register 127, which is added to the time value stored in the temporary register 123 (the time taken to execute the first iteration of the first function 300), the result of the summation being used as the initial value of the second watchdog timer 128. The function validation module 124 therefore programmes (Block 216) the second watchdog timer 128 to monitor a fourth watchdog time 316 equating to the sum mentioned above. The second iteration of the second function 314 is then allowed to execute (Block 218) and the execution is timed by the second watchdog timer 128. However, in this example, the second iteration of the second function 314 fails to complete execution prior to expiry of the fourth watchdog time 316 (Block 222) and so the second watchdog timer 128 communicates the expiry of the fourth watchdog time 316 to the exception module 106 and the exception module 106 generates (Block 210) an exception, which is communicated to the external failure indicator output 110. The results of the outputs of the first and second iterations of the second function 304, 314 therefore do not reach a point during functional validation where they are compared (Block 224).

The above examples have been described in the context of the function comparator unit being arranged to permit further execution of the first and second algorithms in response to receipt by the repository of the first and second results before expiry of the first time period and the second time period, respectively, for example a single core executing multiple iterations of functions. However, the skilled person will appreciate that the principles set forth above can be employed in relation to the detection of execution errors in relation to functions executed by different cores, where the processor comprises a first core supporting execution of the first algorithmic implementation of the first function and a second core supporting execution of the second algorithmic implementation of the first function. It should, however, be appreciated that the algorithmic implementation can be same or different.

Figure 6:
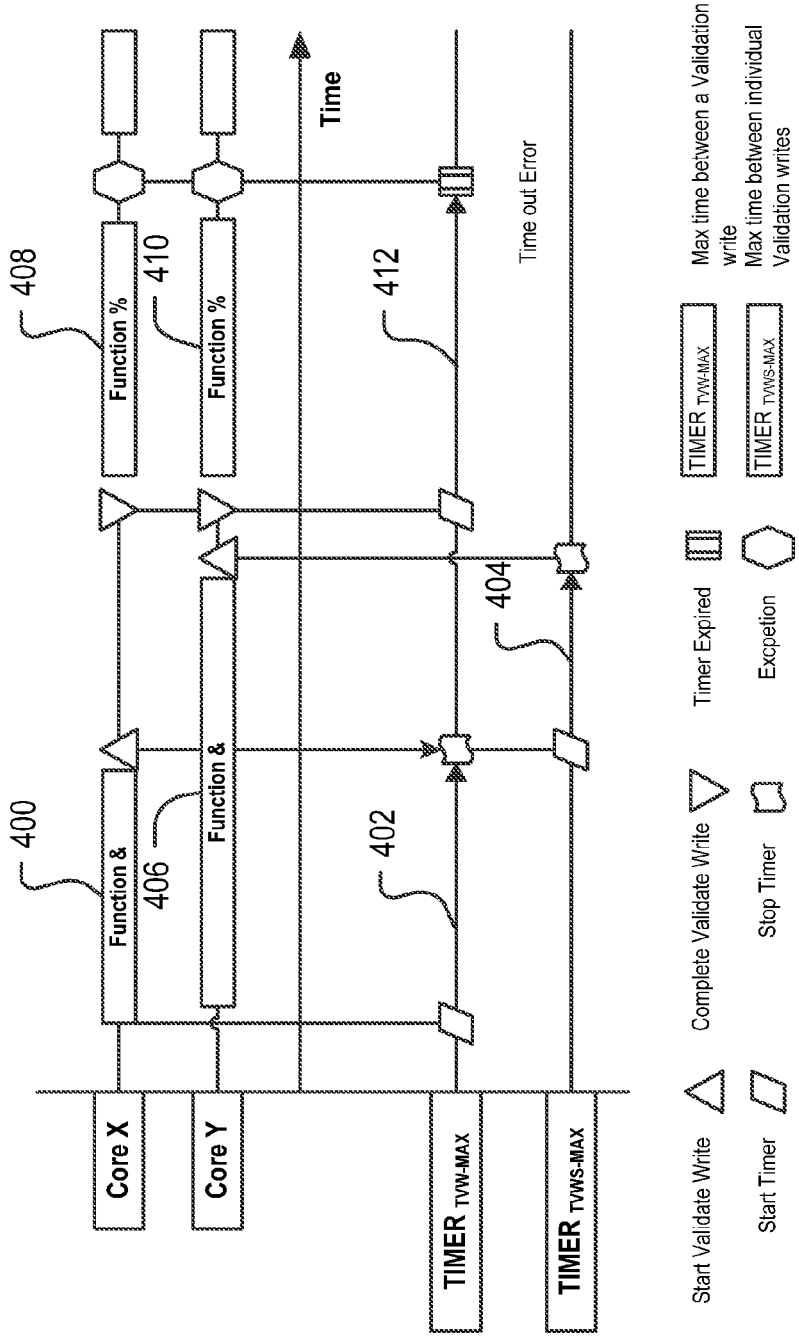
FIG. 6 is an event sequence diagram of a further example of execution of functions by the first core and a second core.
Figure 7:
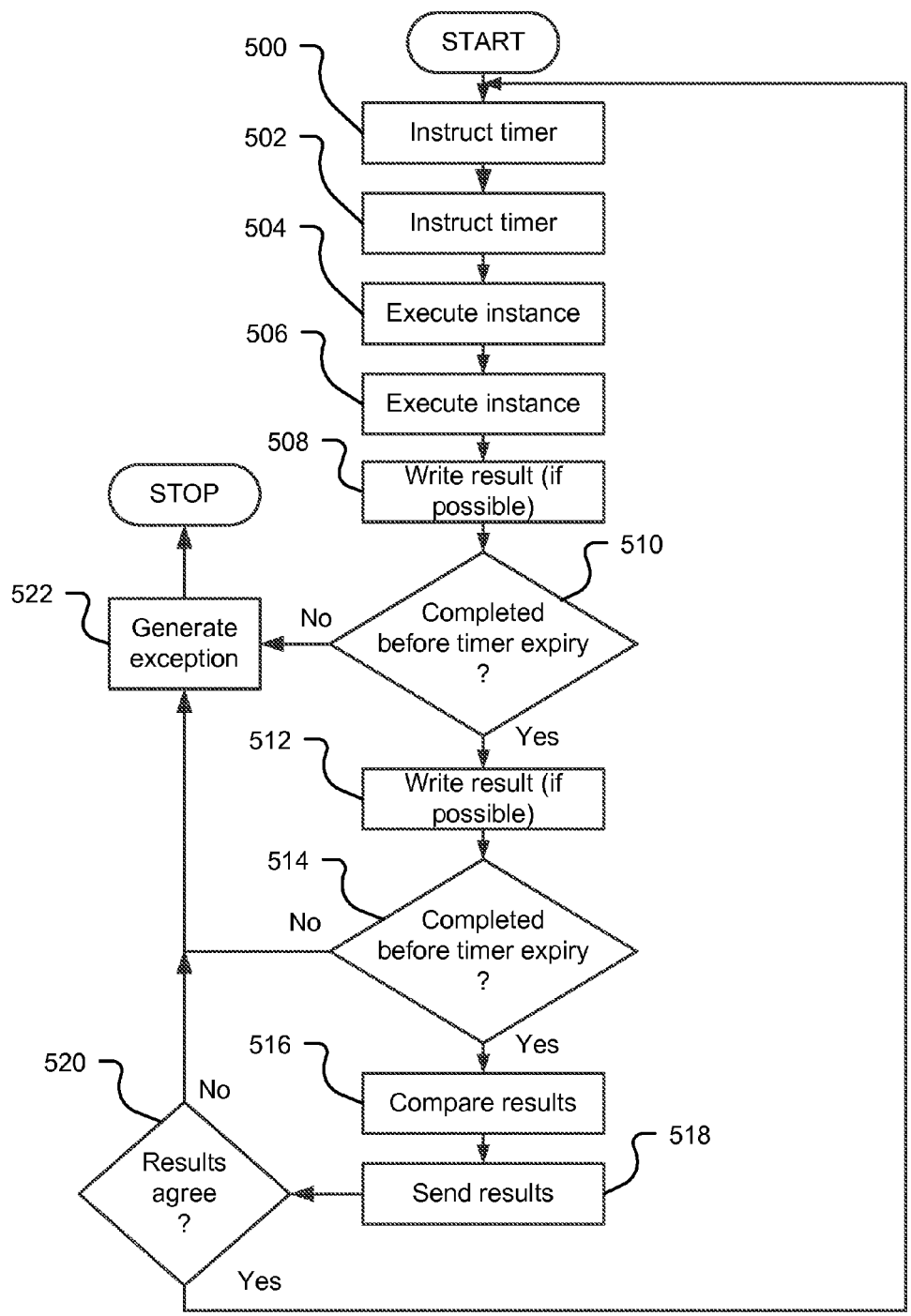
FIG. 7 is a flow diagram of an example of another method of execution error detection employed by the apparatus of FIGS. 1 and 2.

Consequently, in a further example (FIGS. 6 and 7) the first core 112 executes the first function and the second function. However, in this example, the second core 114 also executes the first function and the second function. Nevertheless, it should be appreciated that the validation set can comprise a greater number of cores than two cores. For the sake of conciseness of description and in order not to distract from the core teachings of the examples set forth herein, it will be assumed that the processing system 100 has powered up and has been appropriately configured, for example the core members of the function validation set are selected and the offset register 127 is instead set with an initial value for the second watchdog timers 128.

As in the previous examples, prior to the members of the validation set initiating execution of algorithmic implementations of a first function 400, 406, the first watchdog timer 126 is provided with a watchdog time 402 (Block 500), which is the time for any member of the validation set to write to their respective results register.

In contrast with the time-shifted mode of operation, the second watchdog time can be loaded into the second watchdog timer 128 (Block 502) with a maximum time value representing an acceptable difference between first and last members of the validation set to complete execution of their respective instances of functions and to write to their respective results registers. Thereafter, the members of the validation set, in this example the first core 112 and the second core 114, start executing their respective algorithmic implementations (Blocks 504 and 506) of the first function 400, 406. It should be noted that, at this stage, the second watchdog timer 128 is not activated.

Once a first member of the validation set writes to its results register, i.e. the first one to finish, the validation unit 124 starts the second watchdog timer 128 with the pre-loaded second watchdog time 404. In this example the first member of the validation set to complete the first function 400 and to write (Block 508) to its respective results register (the first results register 134) is the first core 112, which accomplishes this within time 402 before the expiry of the first watchdog timer 126 (Block 510).

The remaining member of the validation set, namely the second core 114, is monitored by the second watchdog timer 128. Once all remaining members of the validation set complete writing to their respective results registers, in this example the second core 114 to the second results register 136 (Block 512), before the second watchdog timer 128 expires (Block 514), the validation modules 124 initiates a compare (Block 516) of the contents of all the results registers for the validation set using the comparator 130. If the results do not agree (Block 520), an exception is generated. Otherwise, as in this example, the members of the validation set are allowed to continue execution of functions. In relation to the comparison of the results generated by the cores of the validation set, in the event that the validation set comprises more than two cores and the results are not in agreement, a majority voting scheme can be implemented, whereby the majority of identical results is taken as the correct result and diagnostics can be implemented in respect of the members of the validation set having results that do not agree with the majority result.

As mentioned above, the validation set is permitted to continue executing functions and so the validation module 124 now pre-loads the first watchdog timer 126 with a third watchdog time 412 and the second watchdog timer 128 with a fourth watchdog time (not shown) (Blocks 500 and 502). The members of the validation set, namely the first and second cores 112, 114, then continue execution of respective algorithmic implementations of the second function 408, 410 (Blocks 504 and 506).

In this example, no members of the validation set, i.e. the first core 112 and the second core 114, complete a write to their respective results register before elapse of the first watchdog time 412 as monitored by the first watchdog timer, i.e. the first watchdog timer expires (Block 510). The validation module 124 therefore communicates the absence of any completed function executions to the exception module 106, which generates an exception (Block 522). Depending upon the configuration of the exception table 132, the exception module 106 can cause the system on chip device 100 to halt and provide an external indication of the occurrence of the exception or a lesser response, for example to issue a simple interrupt to cores identified as malfunctioning.

Figure 8:
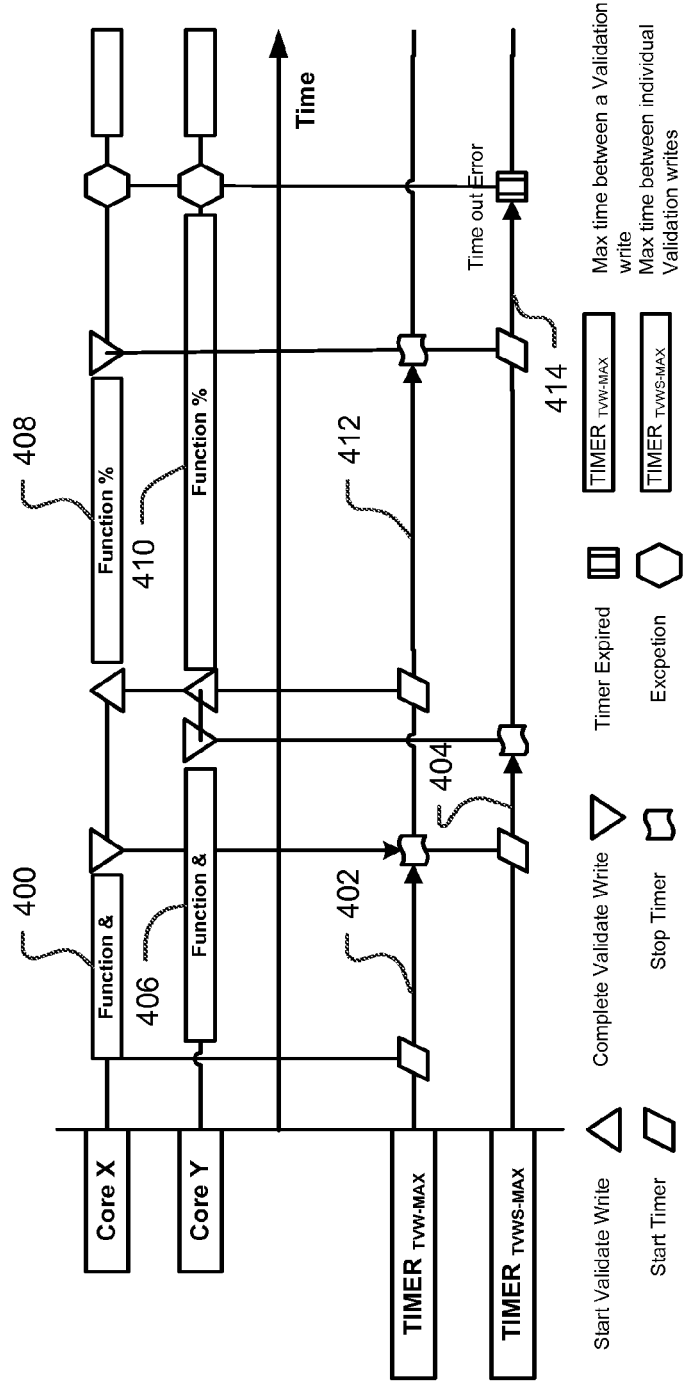
FIG. 8 is an event sequence diagram of another example of execution of functions by the first and second cores.

In an alternative embodiment (FIG. 8), the first core 112 successfully execute the first algorithmic implementation of the second function 408 within the third watchdog time 412 (Block 508) and so the first watchdog timer 126 does not communicate the expiry of the third watchdog time 412 to the exception module 106 and the first core 112 writes (Block 510) the first result of execution of the first algorithmic implementation of the second function 408 to the first results register 134. The second algorithmic implementation of the second function 410 is therefore permitted to continue execution and execution is timed by the second watchdog timer 128 monitoring the fourth core watchdog time 414. In this example, the second core 114 fails to execute the second algorithmic implementation of the second function 410 within the fourth watchdog time 414 (Block 512) and so the second watchdog timer 128 communicates the expiry of the fourth watchdog time 414 to the exception module 106 and the exception module 106 generates (Block 522) an exception, which is communicated to the external failure indicator output 110. The results of the outputs of the first and second algorithmic implementations of the second function 408, 410 therefore do not reach a point during functional validation where they are compared.

Figure 9:
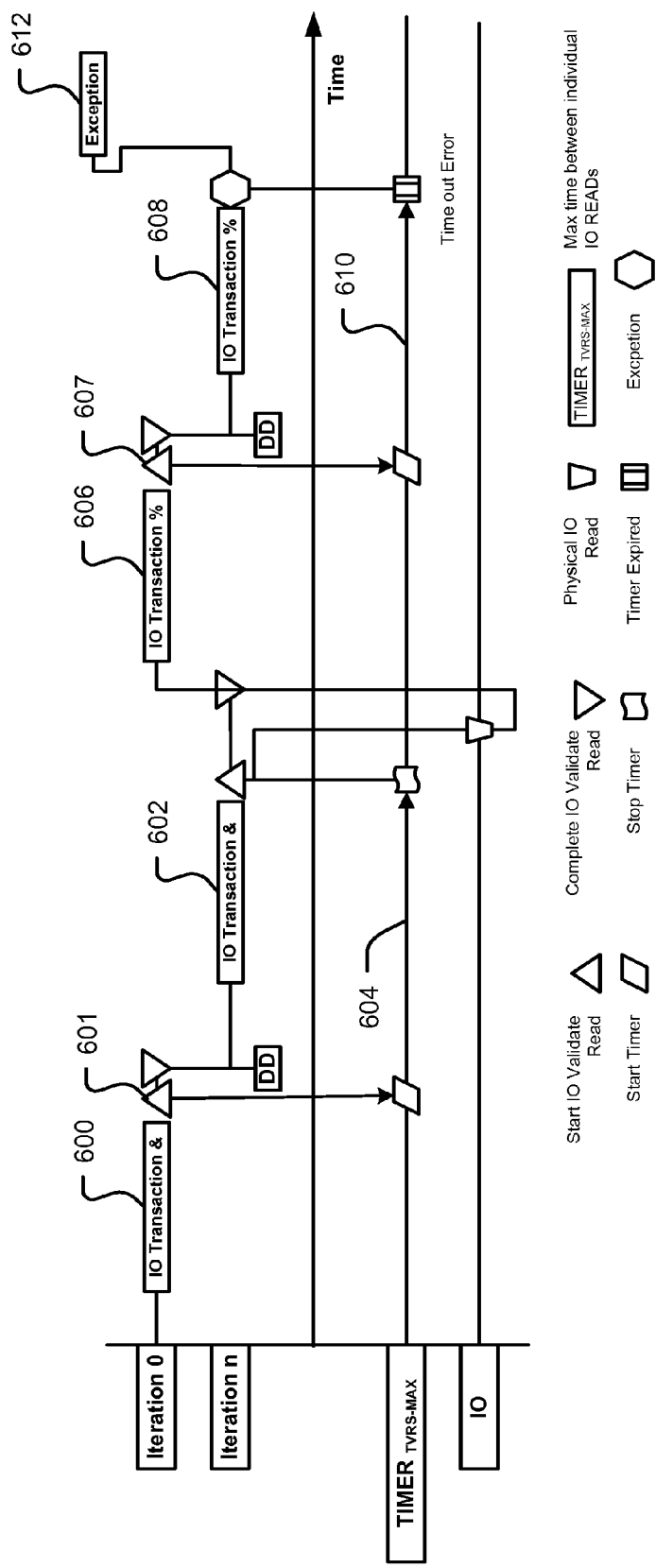
FIG. 9 is an event sequence diagram of an example of execution of input/output transactions by the first core.
Figure 10:
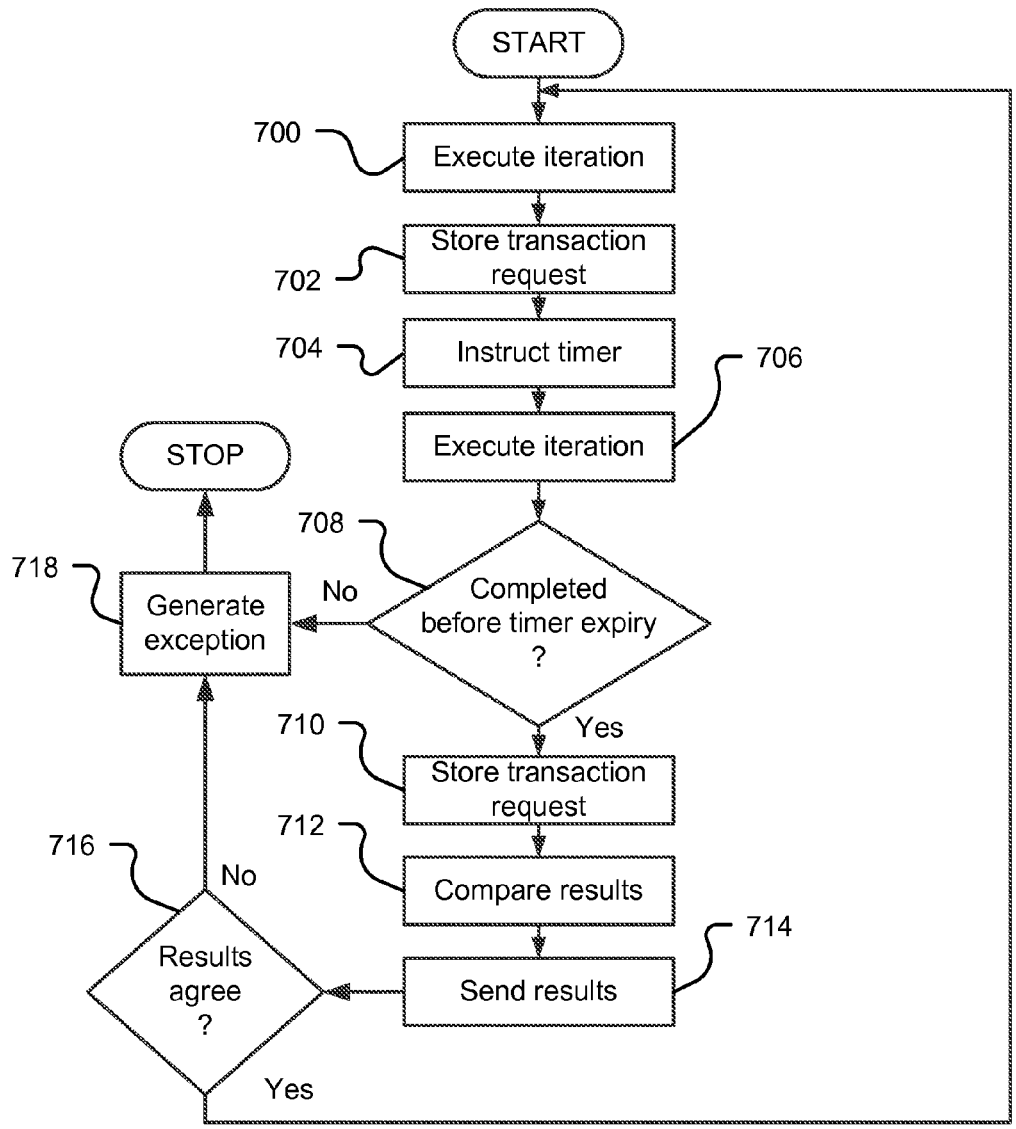
FIG. 10 is a flow diagram of yet another method of execution error detection employed by the apparatus of FIGS. 1 and 2.

The above examples have been described in the context of function execution. However, the principles applied in relation to detecting execution errors of functions can be applied to monitoring accesses to input/output (I/O) devices. In this respect, in a further example (FIGS. 9 and 10), the validation set of users of the I/O resources comprises at least one core performing n iterations of a specific I/O transaction. In this respect, the validation users set is operating in a time-shifted mode of operation. As such, all the iterations (2 through to n) must be completed within a predetermined time monitored by a watchdog timer. Additionally, all the transactions requested of the I/O device, for example the first I/O device 148, must be identical for the I/O operation requested to complete.

In the example, the I/O validation module 126 has been configured to support execution of a number of iterations by the first core 112 equal to two. As mentioned above, the first core 112 has access to an I/O device, for example, a simple input or output pin through or a complex EtherNET controller. It should, however, be appreciated that the I/O device does not need to be register based and can be queue based or based upon any other desired implementation. As such, the I/O device can be expanded to include internal peripherals/accelerators, for example the validation modules described herein, exiting a validation mode.

The first core 112 can execute iterations of I/O transaction calls, for example a first iteration of a first I/O transaction 600 and a second iteration of the first I/O transaction call 602. The first core 112 therefore executes the first iteration of the first I/O transaction 600 (Block 700). As part of the first iteration of the first I/O transaction 600, the first core 112 stores the I/O transaction request in the first transaction request register 144 (Block 702), which occurs at a first completion time 601, whereafter the I/O validation module 126 loads into the third watchdog timer 138 a predetermined time corresponding to a first watchdog time 604 within which the second iteration of the first I/O transaction 602 must be performed (Block 704). The third watchdog timer 138 therefore monitors the remaining iterations to be performed. Thereafter, the first core 112 performs (Block 706) the second iteration of the first I/O transaction 602. In this example, the second iteration of the first I/O transaction 602 is performed within the first watchdog time 604, i.e. the third watchdog timer 138 does not expire before completion of the second iteration of the first I/O transaction 602, and so the first core 112 stores (Block 710) the I/O transaction request of the second iteration of the first I/O transaction 602 in the second transaction request register 146. In a like manner to that set forth above in relation to the functional validation module monitoring cores operating in accordance with a time-shifted mode of operation, it should be appreciated that for the time-shifted mode the number of iterations supported can be greater than two and implementation of a respective number of transaction request registers can be such that the validation users module 126 allows the first core 112 to write to a virtual common transaction request register that is routed to a respective separate transaction request register that is indexed according to the iteration of the function being performed.

After completion of the second iteration of the first I/O transaction 602 by the first core 112, the second function comparator unit 142 then compares (Block 712) the first transaction request and the second transaction request stored in the third and fourth transaction request registers 144, 146 to determine whether the transaction requests agree or disagree. The output of the second function comparator unit 142 is communicated (Block 714) to the exception module 106 and so in the event that the results do not agree (Block 716), the exception module 106 generates (Block 718) an exception, which is communicated to the external failure indicator output 110. In the present example, the results agree and so the I/O validation module 126 performs the I/O transaction. In this example, the I/O transaction is a read transaction, the data provided by the first I/O device 148 is provided to the first core 112.

Thereafter, the first core 112 is ready to execute iterations of a second I/O transaction, for example a first iteration of a second I/O transaction 606 and a second iteration of the second I/O transaction 608 and so the above-described procedure is repeated (Blocks 700 to 718). The first core 112 executes the first iteration of the second I/O transaction 606

(Block 700). Once the first core 112 stores the I/O transaction into the first transaction request register 144 (Block 702), which in this example is another I/O read transaction request, the I/O validation module 126 then, at a second completion time 607, loads (Block 704) into the third watchdog timer 138 another predetermined time corresponding to a second watchdog time 610 within which the second iteration of the second I/O transaction 608 must be performed. Thereafter, the first core 112 performs (Block 706) the second iteration of the second I/O transaction 608. To this end, at commencement of the second iteration of the second I/O transaction 608, the third watchdog timer 138 begins to monitor the second watchdog time 610 to ensure (Block 708) that the second iteration of the second I/O transaction 608 is completed within the second watchdog time 610. In this example, the second iteration of the second I/O transaction 608 fails to complete the performance of the second iteration of the second I/O transaction 608 within the first watchdog time 610 and so the third watchdog timer 144 communicates the expiry of the second watchdog time 610 to the exception module 106 and the exception module 106 generates (Block 718) an exception 612, which is communicated to the external failure indicator output 110. The results of the outputs of the first and second iterations of the second I/O transaction 606, 608 therefore do not reach a point during I/O validation where they are compared.

In the examples described herein, the I/O validation module 126 performs the actual I/O transactions with respect to the I/O devices 148, 150 and so also has additional configuration storage elements (not shown) that contain default I/O state data for each of the I/O devices in the I/O validation set. In the event that an exception occurs the default I/O state data can be used to force or overwrite the state values for any combination of I/O devices in the I/O validation set, depending upon the configuration of the exception table 132 in the exception module 106.

Figure 11:
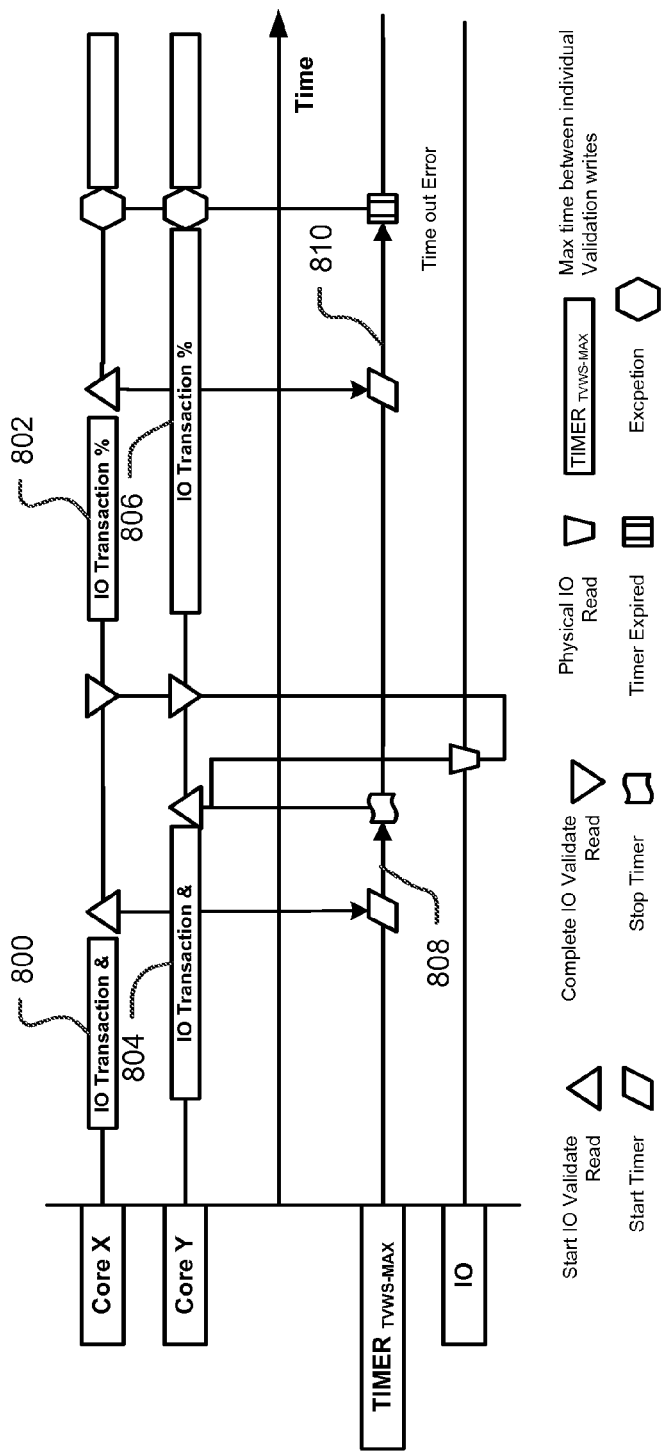
FIG. 11 is an event sequence diagram of an example of execution of input/output transactions by the first and second cores.
Figure 12:
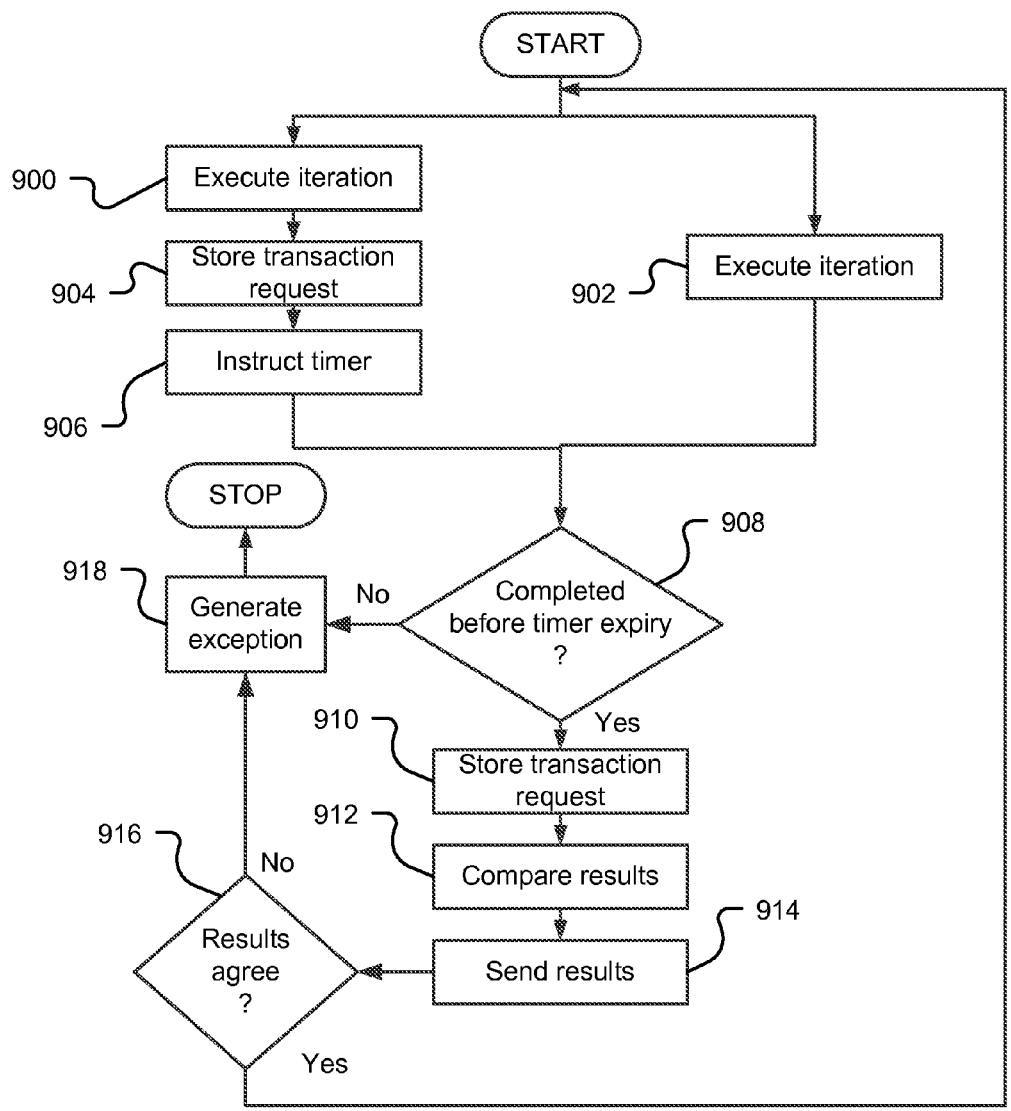
FIG. 12 is a flow diagram of a further method of execution error detection implemented by the apparatus of FIGS. 1 and 2.

Although the above examples of I/O transaction performance have been described in the context of a single core executing multiple iterations of I/O transactions, the skilled person will appreciate that the principles set forth above can be employed in relation to the detection of execution errors in relation to I/O transactions performed by different cores. In this respect, in a further example, the validation users set is operating in a concurrent mode of operation (FIGS. 11 and 12). Consequently, the first core 112 performs a first algorithmic implementation of the first I/O transaction 800 and a first algorithmic implementation of the second I/O transaction 802, which is independent of the second core 114 performing a second algorithmic implementation of the first I/O transaction 804 and a second algorithimic implementation of the second I/O transaction 806.

The first core 112 therefore performs (Block 900) the first algorithmic implementation of the first I/O transaction request 800, which in this example is an I/O read transaction and the result of the first algorithmic implementation of the first I/O transaction request 800 is stored (Block 904) by the first core 112 in the first transaction request register 144. As the first core 112 is the first member of the I/O validation user set to store an I/O transition request, the I/O validation module 126 loads a predetermined time corresponding to a first watchdog time 808 within which the second iteration of the first I/O transaction 804 must be performed into the third watchdog timer 138 (Block 906). At substantially the same time as the first core 112 has been constructing its I/O transaction request, the second member of the IO validation user set, namely the second core 114 is performing the second algorithmic implementation of the first I/O transaction 804. Consequently, while the first core 112 is performing the first algorithmic implementation of the first I/O transaction 800, the second core 114 is performing the second algorithmic implementation of the first I/O transaction 804. Indeed, even after completion of the first algorithmic implementation of the first I/O transaction 800 by the first core 112, the second core 114 is still performing the second algorithmic implementation of the first I/O transaction 804. However, in order to ensure (Block 908) that the second core 114 completes performance of the second iteration of the first I/O transaction 804 within a predetermined time period, the third watchdog timer 138 begins to monitor the first watchdog time 808 to ensure that the second algorithmic implementation of the second I/O transaction 804 is completed within the first watchdog time 808. In this example, the second iteration of the first I/O transaction 804 is performed within the first watchdog time 808 and so the second core 114 stores (Block 910) the I/O transaction request generated by the second iteration of the first I/O transaction 804 in the second transaction request register 146. The second function comparator unit 142 then compares (Block 912) the first I/O transaction request and the second I/O transaction request stored in the first and second transaction request registers 144, 146 to ensure that the transaction requests agree. The output of the second function comparator unit 142 is communicated (Block 914) to the exception module 106 and so in the event that the results do not agree (Block 914), the exception module 106 generates (Block 918) an exception, which is communicated to the external failure indicator output 110. In the present example, the transaction requests agree (Block 916) and so the I/O validation module 126 performs the transaction request (read) with respect to the I/O device 148, and passes the read data to the first core 112 and the second core 114. Thereafter, the above-mentioned procedure is repeated (Blocks 900 to 918) the first and second cores 112, 114 proceed to performance of the first and second algorithmic implementations of the second I/O transaction 802, 806 (Blocks 900 and 902).

Consequently, once the first member of the I/O validation set, in this example the first core 112, stores the I/O transaction request generated by it in the first transaction request register 144, the I/O validation module 126 then programmes (Block 906) the third watchdog timer 138 to monitor another watchdog time 810 equating to a time period within which all the remaining members of the I/O validation user set must complete a store of their respective I/O transaction request. In this example, the second core 114 is the only remaining member of the I/O validation user set and so the another watchdog time 810 corresponds to the time by which the second core 114 must complete the store of the I/O transaction request associated with performance of the second iteration of the second I/O transaction 806. The first core 112 then performs (Block 900) the first iteration of the second I/O transaction 802, which in this example is another I/O read transaction and the result of the first iteration of the second I/O transaction 802 is stored (Block 904) by the first core 112 in the first transaction request register 144. In common with execution of the first and second algorithmic implementations of the first I/O transaction requests 800, 804, the first and second cores 112, 114 can initiate performance (Blocks 900, 902) of the first and second algorithmic implementations of the second I/O transaction 802, 806 substantially contemporaneously. In this example, once the transaction request of the first algorithmic implementation of the second I/O transaction 802 is stored (Block 904) in the first transaction request register 144, the third watchdog timer 138 begins to monitor the second watchdog time 810 to ensure (Block 908) that the second algorithmic implementation of the second I/O transaction 806 is completed within the another watchdog time 810. In this example, the second core 114 fails to complete the performance of the second algorithmic implementation of the second I/O transaction 806 within the another watchdog time 810 and so the third watchdog timer 138 communicates the expiry of the second watchdog time 810 to the exception module 106 and the exception module 106 generates (Block 918) an exception, which is communicated to the external failure indicator output 110. The results of the outputs of the first and second iterations of the second I/O transaction 802, 806 therefore do not reach a point during I/O validation where they are compared.

Figure 13:
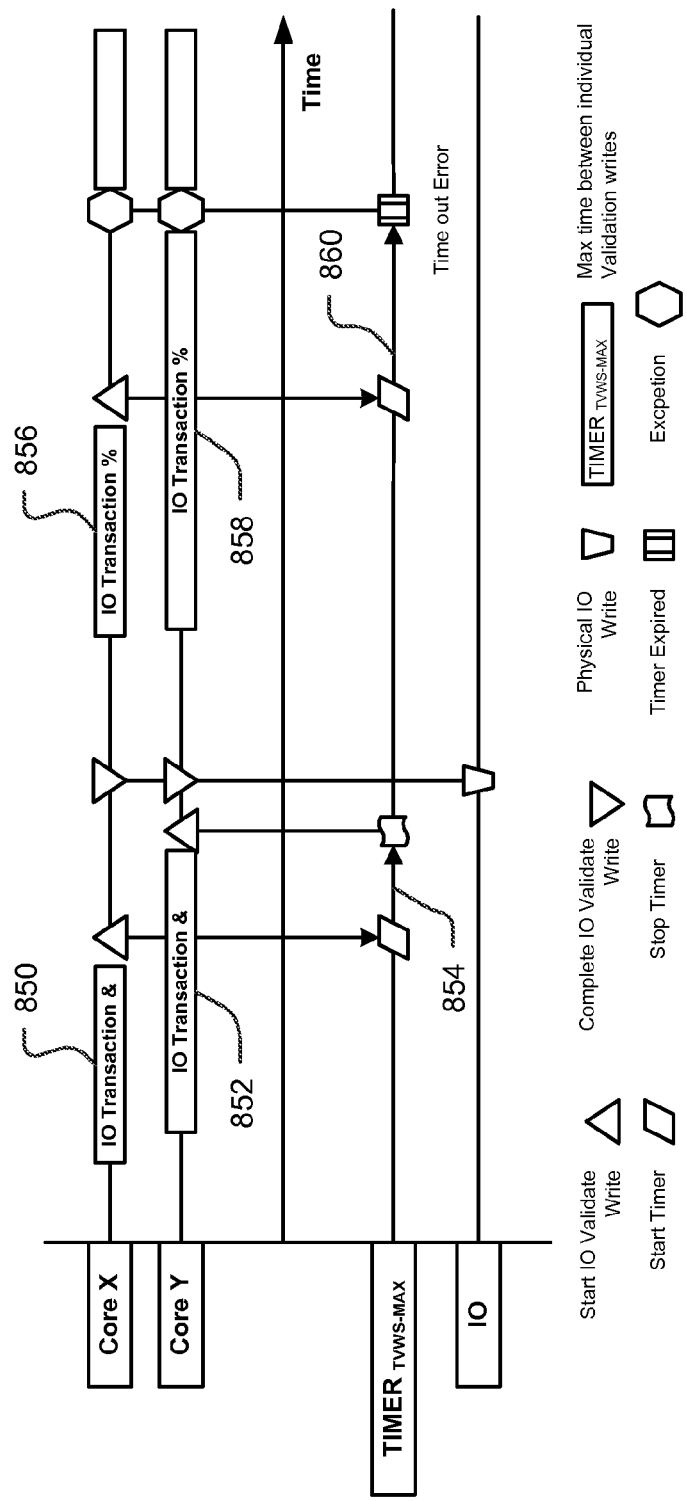
FIG. 13 is an event sequence diagram of yet another example of execution of input/output transactions by the first and second cores.

In yet another example, the first and second I/O transactions are write transactions as opposed to read transactions. Turning to FIG. 13, the first core 112 performs the first algorithmic implementation of the first I/O transaction 850 (Block 900) and the second core 114 performs the second algorithmic implementation of the first I/O transaction 852 (Block 902), which in this example is an I/O write transaction. The first core 112 is the first to complete the generation of the transaction request and stores the transaction request in the first transaction request register 144 (Block 904). The I/O validation module 126 then programs and starts the third watchdog timer 138 (Block 906) in a like manner to that already described above. Consequently, while the first core 112 is performing the first algorithmic implementation of the first I/O transaction 850, the second core 114 is performing the second algorithmic implementation of the first I/O transaction 852. Indeed, even after completion of the first algorithmic implementation of the first I/O transaction 850 by the first core 112, the second core 114 is still performing the second algorithmic implementation of the first I/O transaction 852. However, in order to ensure that the second core 114 completes performance of the second algorithmic implementation of the first I/O transaction 852 within a predetermined time period, the third watchdog timer 138 begins to monitor (Block 908) the first watchdog time 854 upon completion of the first algorithmic implementation of the first I/O transaction 852 to ensure that the second algorithmic implementation of the second I/O transaction 852 is completed within the first watchdog time 854. In this example, the second iteration of the first I/O transaction 852 is performed within the first watchdog time 854 and so the second core 114 stores (Block 910) the transaction request associated the second iteration of the first I/O transaction 852 in the second transaction request register 146. The second function comparator unit 142 then compares (Block 912) the first transaction request and the second transaction request stored in the first and second transaction request registers 144, 146 to ensure that the transaction requests agree. The output of the second function comparator unit 142 is communicated (Block 914) to the exception module 106 and so in the event that the results do not agree, the exception module 106 generates (Block 918) an exception, which is communicated to the external failure indicator output 110. In the present example, the results agree and so the agreed transaction is performed, which in this example is a write transaction to the first I/O device 148 by the I/O validation module 126 and the first core 112 and the second core 114 are permitted to proceed and the above-described procedure is repeated (Block 900 to 918) in respect of the second I/O transaction. Consequently, thereafter the first and second cores 112, 114 proceed to performance of first and second algorithmic implementations of the second I/O transaction 856, 858.

The first core 112 therefore then performs (Block 900) the first iteration of the second I/O transaction 856, which in this example is another I/O write transaction and the first transaction request generated by the first iteration of the second I/O transaction 856 is stored (Block 904) by the first core 112 in the first transaction request register 144. In common with execution of the first and second algorithmic implementations of the first I/O transaction 850, 852, the first and second cores 112, 114 can initiate performance (Block 900, 902) of the first and second algorithmic implementations of the second I/O transaction 856 substantially contemporaneously. However, in this example the transaction request generated by the first algorithmic implementation of the second I/O transaction 856 is stored in the first transaction request register 144 (Block 904) before completion of the second algorithmic implementation of the second I/O transaction 858 and so upon storage of the transaction request in respect of the first algorithmic implementation of the second I/O request 856, the I/O validation module 126 programs and starts the third watchdog timer 138 in a like manner to that described above and so begins to monitor a second watchdog time 860 to ensure (Block 908) that the second algorithmic implementation of the second I/O transaction 858 is completed within the second watchdog time 860. In this example, the second core 114 fails to complete the performance of the second algorithmic implementation of the second I/O transaction 858 within the second watchdog time 860 and so the third watchdog timer 138 communicates the expiry of the second watchdog time 860 to the exception module 106 and the exception module 106 generates (Block 918) an exception, which is communicated to the external failure indicator output 110. The results of the outputs of the first and second iterations of the second I/O transaction 856, 858 therefore do not reach a point during I/O validation where they are compared. In such circumstances, and depending upon the configuration of the exception table 132 of the exception module 106, the I/O validation module 126, after interrogating the exception module 106 for a course of action stored in the exception table 132, can elect either not to perform any I/O transaction, i.e. continue as if the I/O transaction request had not been made, instigate a default, pre-configured, I/O transaction, or instigate an I/O transaction based upon a majority of identical results.

Hence, it can be seen that the I/O transaction comparator unit 142 is arranged to execute the first and second input/output transaction request in response to the first and second input/output transaction requests being determined to be consistent.

In a further example, the processor 102 can use the third core 116 to execute a third sequence of instructions implementing the operation. Additionally or alternatively, the second core 114 can support the third sequence of instructions. The third implementation can be a second instantiation of the second implementation. The third sequence of instructions can be arranged to generate a third result, the function comparator unit is arranged to compare the first, second and third results for consistency and to identify a majority of the first, second and third results that are consistent. In this example, the function comparator unit can be arranged to identify an inconsistent result from the first, second and third results and to prevent further execution of the sequence of instructions from the first, second and third implementations of the algorithm associated with the inconsistent result.

It is thus possible to provide an integrated circuit, a data processing device provided with an error detection unit and a method of error detection that reduces hardware overhead by avoiding the use of a lockstep technique to ensure consistent core execution. This results in a lower manufacturing cost and also simplifies device construction. Furthermore, functions can be implemented using different code, such as code being optionally written in one or more programming languages. In this regard, an intended function of the first implementation can be the same as an intended function of the second implementation. As such, the processor can comprise a third core that can support execution of a third sequence of instructions.

Of course, the above advantages are examples, and these or other advantages may be achieved by the examples set forth herein. Further, the skilled person will appreciate that not all advantages stated above are necessarily achieved by embodiments described herein.

In the foregoing specification, the invention has been described with reference to specific examples of embodiments of the invention. It will, however, be evident that various modifications and changes may be made therein without departing from the broader scope of the invention as set forth in the appended claims. For example, the examples, described herein can be implemented in relation to other applications requiring execution of multiple algorithmic implementations of a function by multiple cores, respectively, and/or execution of multiple iterations of a function by a core. Additionally or alternatively, the examples described herein can be implemented in relation to other applications requiring execution of multiple algorithmic implementations of I/O transactions by multiple cores, respectively, and/or execution of multiple iterations of an I/O transaction by a core. As another example, although the execution of functions and I/O transactions have been described herein as separate executions, the skilled person should appreciate that the execution of one or more I/O transactions can be performed as part of a function.

In the above-described examples, a maximum of two cores are described in use. However, the skilled person should appreciate that a greater number of cores executing a greater number of functions and/or I/O transactions can be employed. Indeed, it should be appreciated that a mixed configuration can be employed whereby a number of cores are each executing respective algorithmic implementations of functions and/or I/O transactions and another number of cores can each be executing multiple iterations of functions and/or I/O transactions.

Although FIGS. 1 and 2 and the discussions thereof describe an example information processing architecture, this example architecture is presented merely to provide a useful reference in discussing various aspects of the invention. Of course, the description of the architecture has been simplified for purposes of discussion, and the device may be implemented with any suitable information processing architecture. Those skilled in the art will recognize that the boundaries between logic blocks are merely illustrative, and that alternative embodiments may merge logic blocks or circuit elements or impose an alternate decomposition of functionality upon various logic blocks or circuit elements.

Thus, it is to be understood that the architectures depicted herein are merely examples, and that in fact many other architectures can be implemented which achieve the same functionality. For example, the first core can have a first architecture associated therewith and the second core can have a second architecture associated therewith, the first and second architectures being different. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of the system-on-chip device 100 are circuitry located on a single integrated circuit or within a same device. Alternatively, the system-on-chip device 100 may include any number of separate integrated circuits or separate devices interconnected with each other. For example, the first core 112 may be located on a same integrated circuit as the second core 114 or on a separate integrated circuit or located within another device, peripheral or slave discretely separate from other elements of system-on-chip device 100.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

The examples set forth herein, or portions thereof, may be implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A data processing device provided with an error detection unit, the device comprising:
   a processor arranged to support execution of an operation and configured to execute a first sequence of instructions in accordance with a first implementation of the operation and a second sequence of instructions in accordance with a second implementation of the operation, the first and second sequences of instructions generating, when executed, a first result and a second result, respectively; and
   configurable circuitry arranged to support a repository to receive the first result and the second result following generation thereof; wherein
   the configurable circuitry is configured as a function comparator unit arranged to compare the first and second results for consistency and to control further execution of the first implementation and the second implementation in response to a result of the comparison, wherein the function comparator unit comprises a first watchdog timer unit arranged to police a first time period in response to an instruction to perform the operation, the first watchdog timer identifying an exception condition in response to elapse of the first time period without receipt by the repository of the first result, and the function comparator unit further comprising a second watchdog timer arranged to police a second time period in response to receipt by the repository of the first result, the second watchdog timer identifying an exception condition in response to elapse of the second time period without receipt by the repository of the second result.

2. A data processing device as claimed in claim 1, wherein the function comparator unit is arranged to permit further execution of the first and second sequences of instructions in response to receipt by the repository of the first and second results before expiry of the first time period and the second time period, respectively.

3. A data processing device as claimed in claim 1, wherein the processor comprises a core supporting sequential execution of the first sequence of instructions and the second sequence of instructions.

4. A data processing device as claimed in claim 3, wherein the function comparator unit is arranged to set a duration of the second time period to be equal to a predetermined period of time in excess of the duration of the first time period.

5. A data processing device as claimed in claim 1, wherein the processor comprises a first core supporting execution of the first sequence of instructions and a second core supporting execution of the second sequence of instructions.

6. A data processing device as claimed in claim 5, wherein the first core has a first architecture associated therewith and the second core has a second architecture associated therewith, the first and second architectures being different.

7. A data processing device as claimed in claim 1, wherein the first sequence of instructions is in accordance with a first implementation methodology and the second sequence of instructions is in accordance with a second implementation methodology.

8. A data processing device as claimed in claim 5, wherein the processor comprises a third core supporting execution of a third sequence of instructions.

9. A data processing device as claimed in claim 5, wherein the second core supports a third sequence of instructions.

10. A data processing device as claimed in claim 9, wherein the third sequence of instructions is a second instantiation of the second implementation.

11. A data processing device as claimed in claim 9, wherein the third sequence of instructions is arranged to generate a third result, the function comparator unit is arranged to compare the first, second and third results for consistency and to identify a majority of the first, second and third results that are consistent.

12. A data processing device as claimed in claim 11, wherein the function comparator unit is arranged to identify an inconsistent result from the first, second and third results and to prevent further execution of the sequence of instructions from the first, second and third implementations of the operation associated with the inconsistent result.

13. A data processing device as claimed in claim 1, wherein the first result and the second result are the results of a first input/output transaction request and a second input/output transaction request, respectively.

14. A data processing device as claimed in claim 13, wherein the function comparator unit is arranged to execute the first and second input/output transaction request in response to the first and second input/output transaction requests being determined to be consistent.

15. A data processing device as claimed in claim 1, wherein the comparison performed by the function comparator unit is relative to a predetermined threshold.

16. An integrated circuit comprising a data processing device as claimed in claim 1.

17. A method of execution error detection comprising:
   supporting execution of an operation comprising a first sequence of instructions in accordance with a first algorithmic implementation of the operation and execution of a second sequence of instructions in accordance with a second algorithmic implementation of the operation;
   executing the first sequence of instructions to generate a first result;
   executing the second sequence of instructions to generate a second result;
   receiving the first result and the second result in a repository;
   using a first watchdog timer, identifying an exception condition in response to elapse of a first time period without receipt by the repository of the first result;
   using a second watchdog timer, identifying an exception condition in response to elapse of a second time period without receipt by the repository of the second result, wherein the second time period begins when the first result is received by the repository; and
   comparing the first and second results for consistency and controlling further execution of the first implementation and the second implementation in response to a result of the comparison.

* * * * *